(12) United States Patent
Faied (10) Patent No.: US 10,808,639 B2
(45) Date of Patent: Oct. 20, 2020

(54) TECHNIQUES FOR MEASURING FUEL INJECTOR FLOW IRREGULARITY WITHOUT REMOVAL FROM VEHICLE

(71) Applicant: Louai Faied, Rochester Hills, MI (US)

(72) Inventor: Louai Faied, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 226 days.

(21) Appl. No.: 16/025,529

(22) Filed: Jul. 2, 2018

(65) Prior Publication Data

US 2020/0003144 A1 Jan. 2, 2020

(51) Int. Cl.
*F02D 41/22* (2006.01)
*F02D 41/14* (2006.01)
*F02M 65/00* (2006.01)

(52) U.S. Cl.
CPC ....... *F02D 41/221* (2013.01); *F02D 41/1454* (2013.01); *F02M 65/003* (2013.01); *F02D 2041/224* (2013.01); *F02D 2200/0602* (2013.01); *F02D 2200/101* (2013.01)

(58) Field of Classification Search
CPC ............... F02D 41/221; F02D 41/1454; F02D 2041/0602; F02D 2200/0602; F02D 2200/101; F02M 65/003
USPC .......................................................... 701/34
See application file for complete search history.

(56) References Cited

U.S. PATENT DOCUMENTS

| 5,445,019 A | 8/1995 | Glidewell et al. |
| 7,152,594 B2 * | 12/2006 | Anilovich ........... F02D 41/1454 123/690 |
| 7,761,223 B2 * | 7/2010 | Wang ..................... F02D 35/023 701/114 |
| 2006/0190149 A1 * | 8/2006 | Lapant .................. B60K 15/06 702/182 |
| 2011/0200256 A1 * | 8/2011 | Saubat ................. G06K 9/2063 382/195 |
| 2017/0350340 A1 * | 12/2017 | Sarwar ...................... F01N 3/20 |

\* cited by examiner

*Primary Examiner* — Yazan A Soofi
(74) *Attorney, Agent, or Firm* — Ralph E Smith (57) ABSTRACT

Diagnostic systems and methods for a fuel system of an engine of a vehicle utilize a fuel rail pressure sensor, an engine speed sensor, an exhaust oxygen (O2) sensor, and a controller configured to perform a diagnostic routine for the fuel system during which fuel injectors of the fuel system do not need to be removed from the engine. The diagnostic routine comprises operating the engine at a set of predetermined operating points and detecting one or more malfunctions of one or more of the fuel injectors based on measured fuel rail pressure, measured engine speed, and measured O2 concentration at each of the set of predetermined operating points. Any fuel injector malfunctions detected during the diagnostic routine could be output to a diagnostic device operated by a human technician, e.g., in a single diagnostic report.

18 Claims, 5 Drawing Sheets

TECHNIQUES FOR MEASURING FUEL INJECTOR FLOW IRREGULARITY WITHOUT REMOVAL FROM VEHICLE

FIELD

The present application generally relates to vehicle fuel injector diagnostics and, more particularly, to techniques for measuring fuel injector flow irregularity without having to remove the fuel injectors from the vehicle.

BACKGROUND

A fuel system of an engine includes fuel injectors that provide fuel to respective cylinders. A malfunction of the fuel system could cause an inaccurate amount of fuel to be provided, which could result in increased emissions and/or misfires. One type of fuel system malfunction is irregular fuel injector flow. In order to diagnose this type of malfunction, a highly-trained technician will typically remove the fuel injectors for subjective testing. This often involves the technician moving the fuel injectors to different cylinders and monitoring operation of the engine to determine which (if any) of the fuel injectors appear have an irregular flow malfunction. This is a timely and costly process due to the need for highly-trained technicians and because fuel injector seals are not reusable. Non-malfunctioning fuel injectors could also be unnecessarily replaced, further increasing costs. Accordingly, while such fuel system diagnostic techniques do work well for their intended purpose, there remains a need for improvement in the relevant art.

SUMMARY

According to one example aspect of the invention, a diagnostic system for a fuel system of an engine of a vehicle. In one exemplary implementation, the diagnostic system comprises: a fuel rail pressure sensor configured to measure a fuel rail pressure indicative of a pressure of a fuel in a fuel rail of the fuel system, wherein the fuel rail provides the fuel to fuel injectors of the fuel system, an engine speed sensor configured to measure an engine speed indicative of a rotational speed of a crankshaft of the engine, an exhaust oxygen (O2) sensor configured to measure an O2 concentration indicative of an oxygen level of exhaust gas produced by the engine, and a controller configured to perform a diagnostic routine for the fuel system during which the fuel injectors do not need to be removed from the engine, the diagnostic routine comprising: operating the engine at a set of predetermined operating points, and detecting one or more malfunctions of one or more of the fuel injectors based on the measured fuel rail pressure, the measured engine speed, and the measured O2 concentration at each of the set of predetermined operating points.

In some implementations, the set of predetermined operating points each includes at least one of (i) a predetermined idle speed of the engine and (i) a predetermined commanded fuel rail pressure. In some implementations, the set of predetermined operating points are determined such that different types of malfunctions of the one or more fuel injectors are able to be distinguished from each other. In some implementations, the controller is configured to, at each predetermined operating point, calculate and utilize at least one of: a coefficient of variation (COV) of the measured engine speed, a fuel rail pressure error indicative of a difference between a commanded fuel rail pressure and the measured fuel rail pressure, and a fuel trim correction value based on the measured O2 concentration.

In some implementations, the controller is configured to: operate the engine at a first predetermined operating point corresponding to a first idle speed of the engine, detect a fuel pressure regulation malfunction when the fuel rail pressure error exceeds a first fuel rail pressure error threshold, and detect a low flow fuel injector malfunction when the COV is less than a first COV threshold. In some implementations, the controller is configured to: operate the engine at a second predetermined operating point corresponding to a second idle speed of the engine, the second idle engine speed being greater than the first idle engine speed, detect the fuel pressure regulation malfunction when the fuel rail pressure exceeds a second fuel rail pressure threshold, and detect a high flow fuel injector malfunction when the COV is greater than a second COV threshold.

In some implementations, the controller is configured to: operate the engine at a third predetermined operating point corresponding to a third idle speed of the engine, the third idle engine speed being greater than the second idle engine speed, detect a plugged fuel injector malfunction when the fuel trim correction value is greater than a fuel trim correction threshold, and detect an overflowing fuel injector malfunction when the fuel trim correction value is less than the fuel trim correction threshold. In some implementations, the controller is configured to: operate the engine at a fourth predetermined operating point corresponding to a fourth idle speed of the engine, the fourth idle engine speed being less than the third idle engine speed and greater than the first and second idle engine speeds, command the fuel rail pressure to a predetermined fuel rail pressure, calculate a rate of change of the measured fuel rail pressure after each fuel injection event of the engine, and detect a malfunction of a particular one of the fuel injectors corresponding to the previous fuel injection event when the corresponding calculated rate of change of the measured fuel rail pressure is less than a rate of change threshold.

In some implementations, the controller s configured to: operate the engine at a fourth predetermined operating point corresponding to a fourth idle speed of the engine, the fourth idle engine speed being less than the third idle engine speed and greater than the first and second idle engine speeds, command the fuel rail pressure to a predetermined fuel rail pressure, calculate a rate of change of the measured fuel rail pressure after each fuel injection event of the engine, calculate an average rate of change of the measured fuel rail pressure indicative of an average of the calculated rates of change of the measured fuel rail pressure across all of the fuel injectors, and detect a malfunction of a particular one of the fuel injectors when its corresponding calculated rate of change of the measured fuel rail pressure is more than a threshold amount less than the calculated average rate of change of the measured fuel pressures.

According to another example aspect of the invention, a diagnostic method for a fuel system of an engine of a vehicle. In one exemplary implementation, the method comprises: obtaining, by a controller and from a fuel rail pressure sensor, a measured fuel rail pressure indicative of a pressure of a fuel in a fuel rail of the fuel system, wherein the fuel rail provides the fuel to fuel injectors of the fuel system, obtaining, by the controller and from an engine speed sensor, a measured engine speed indicative of a rotational speed of a crankshaft of the engine, obtaining, by the controller and from an exhaust O2 sensor, a measured O2 concentration indicative of an oxygen level of exhaust gas produced by the engine, and performing, by the controller, a diagnostic routine for the fuel system during which the fuel injectors do not need to be removed from the engine, the diagnostic routine comprising: operating, by the controller, the engine at a set of predetermined operating points, and detecting, by the controller, one or more malfunctions of one or more of the fuel injectors based on the measured fuel rail pressure, the measured engine speed, and the measured O2 concentration at each of the set of predetermined operating points.

In some implementations, the set of predetermined operating points each includes at least one of (i) a predetermined idle speed of the engine and (i) a predetermined commanded fuel rail pressure. In some implementations, the set of predetermined operating points are determined such that different types of malfunctions of the one or more fuel injectors are able to be distinguished from each other. In some implementations, the method further comprises, at each predetermined operating point, calculating and utilizing, by the controller, at least one of: a COV of the measured engine speed, a fuel rail pressure error indicative of a difference between a commanded fuel rail pressure and the measured fuel rail pressure, and a fuel trim correction value based on the measured O2 concentration.

In some implementations, the method further comprises: operating, by the controller, the engine at a first predetermined operating point corresponding to a first idle speed of the engine, detecting, by the controller, a fuel pressure regulation malfunction when the fuel rail pressure error exceeds a first fuel rail pressure error threshold, and detecting, by the controller, a low flow fuel injector malfunction when the COV is less than a first COV threshold. In some implementations, the method further comprises: operating, by the controller, the engine at a second predetermined operating point corresponding to a second idle speed of the engine, the second idle engine speed being greater than the first idle engine speed, detecting, by the controller, the fuel pressure regulation malfunction when the fuel rail pressure exceeds a second fuel rail pressure threshold, and detecting, by the controller, a high flow fuel injector malfunction when the COV is greater than a second COV threshold.

In some implementations, the method further comprises: operating, by the controller, the engine at a third predetermined operating point corresponding to a third idle speed of the engine, the third idle engine speed being greater than the second idle engine speed, detecting, by the controller, a plugged fuel injector malfunction when the fuel trim correction value is greater than a fuel trim correction threshold, and detecting, by the controller, an overflowing fuel injector malfunction when the fuel trim correction value is less than the fuel trim correction threshold. In some implementations, the method further comprises: operating, by the controller, the engine at a fourth predetermined operating point corresponding to a fourth idle speed of the engine, the fourth idle engine speed being less than the third idle engine speed and greater than the first and second idle engine speeds, commanding, by the controller, the fuel rail pressure to a predetermined fuel rail pressure, calculating, by the controller, a rate of change of the measured fuel rail pressure after each fuel injection event of the engine, and detecting, by the controller, a malfunction of a particular one of the fuel injectors corresponding to the previous fuel injection event when the corresponding calculated rate of change of the measured fuel rail pressure is less than a rate of change threshold.

In some implementations, the method further comprises: operating, by the controller, the engine at a fourth predetermined operating point corresponding to a fourth idle speed of the engine, the fourth idle engine speed being less than the third idle engine speed and greater than the first and second idle engine speeds, commanding, by the controller, the fuel rail pressure to a predetermined fuel rail pressure, calculating, by the controller, a rate of change of the measured fuel rail pressure after each fuel injection event of the engine, calculating, by the controller, an average rate of change of the measured fuel rail pressure indicative of an average of the calculated rates of change of the measured fuel rail pressure across all of the fuel injectors, and detecting, by the controller, a malfunction of a particular one of the fuel injectors when its corresponding calculated rate of change of the measured fuel rail pressure is more than a threshold amount less than the calculated average rate of change of the measured fuel pressures.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed implementations and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, conventional fuel system diagnostics typically involve a highly-trained technician manually removing fuel injectors and performing subjective testing, such as for irregular injector flow. There are varying degrees of fuel injector malfunctions and there are also other fuel system malfunctions (e.g., a pressure regulation malfunction). Such conventional diagnostic techniques are therefore prone for misdiagnosis and increased costs. Accordingly, improved diagnostic techniques are presented that are able to measure fuel injector flow irregularity without removal from the engine. These techniques utilize existing engine sensors and run an intrusive diagnostic routine during vehicle servicing that is able to detect the specific malfunction of the fuel system. The benefits of these techniques include decreased time and costs by not wasting fuel injector seals, not unnecessarily replacing non-malfunctioning fuel injectors, and not needing highly-trained technicians.

Figure 1:
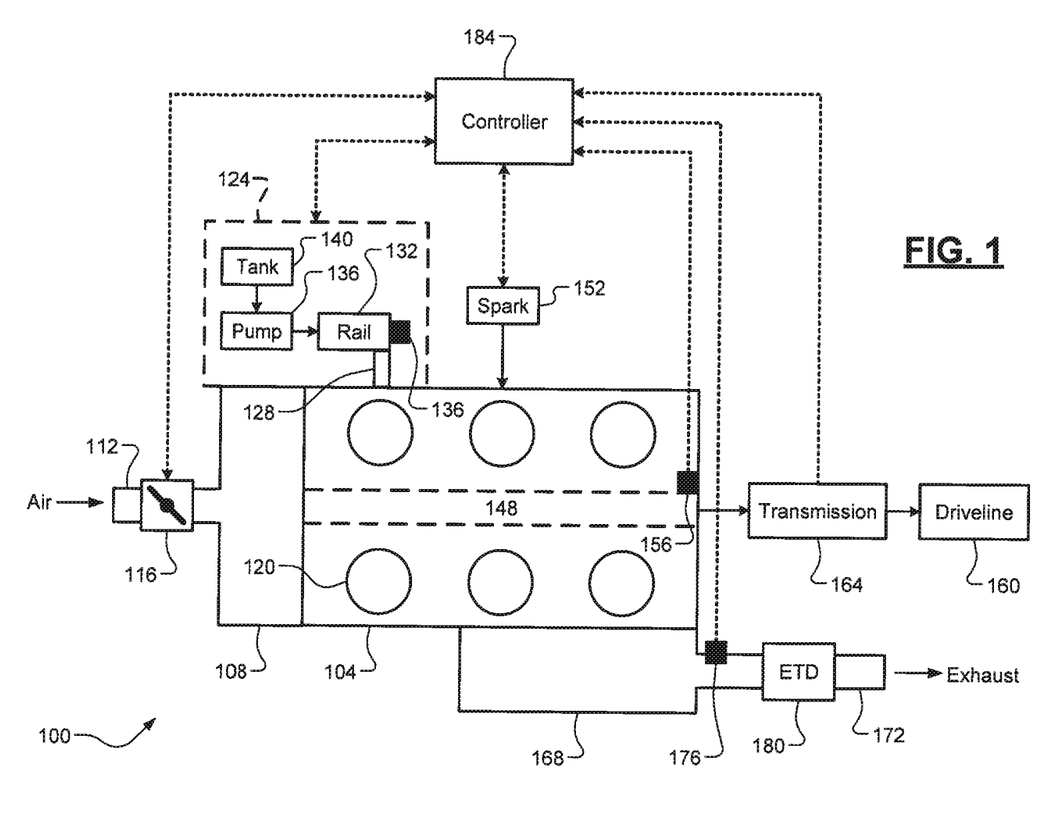
FIG. 1 is a diagram of an example vehicle according to the principles of the present disclosure.

Referring now to FIG. 1, a diagram of a vehicle 100 comprising an example engine 104 is presented. The engine 104 draws air into an intake manifold 108 through an induction system 112 that is regulated by a throttle valve 116. The air in the intake manifold 108 is distributed to a plurality of cylinders 120 and combined with fuel (gasoline, diesel, etc.) from a plurality of respective fuel injectors 128 of a fuel system 124. While six cylinders are shown, it will be appreciated that the engine 104 could include any suitable number of cylinders. The fuel injectors 128 could be arranged for port fuel injection (PFI) or direct fuel injection (DFI). The diagnostic techniques of the present disclosure are particularly beneficial for DFI engines because their fuel injectors are more difficult to remove and reinstall and thus would require more time and/or an even more skilled technician if performing manual removal and reinstallation for conventional flow diagnostics.

The fuel system 124 further includes a fuel rail 132 that houses pressurized fuel. When the fuel injectors 128 open, the pressure in the fuel rail 132 causes the fuel therein to flow through the fuel injectors 128 and into the respective cylinders 120. A fuel rail pressure sensor 136 measures the pressure of the fuel housed in the fuel rail 132. The fuel rail 132 receives the pressurized fuel from a fuel pump 140 (e.g., a high pressure fuel pump) that pumps the fuel from a fuel tank 144 and into the fuel rail 132. The air/fuel mixture is compressed within the cylinders 120 by respective pistons (not shown) and the compressed air/fuel mixture is ignited to drive the pistons, which in turn rotatably turn a crankshaft 148 to generate drive torque for propelling the vehicle 100. This ignition of the compressed air/fuel mixture could be auto-ignition due to a critical temperature/pressure being reached during compression (e.g., diesel engines) or could be electronically initiated by spark from optional spark plugs 152 (e.g., spark-ignition engines).

An engine speed (RPM) sensor 156 measures a rotational position/speed of the crankshaft 148 (engine speed). The drive torque at the crankshaft 148 is transferred to a driveline 160 of the vehicle 100 via a transmission 164 to propel the vehicle 100. Exhaust gas resulting from combustion is expelled from the cylinders 120 into an exhaust manifold 168 that is connected to an exhaust system 172 that comprises an exhaust oxygen (O2) sensor 176 (e.g., a wide-range O2, or WRO2 sensor) and at least one optional exhaust treatment device (ETD) 180. The exhaust O2 sensor 176 is configured to measure an oxygen concentration of the exhaust gas. The output of the exhaust O2 sensor 176 is typically used to adjust an air/fuel ratio of the engine 104. For example, the output of the exhaust O2 sensor 176 indicate a lean or rich exhaust gas, which could be used to enrich or enlean the engine's air/fuel ratio. This is also known as a "fuel trim correction" and will be discussed in greater detail later.

The exhaust treatment device 180 is configured to treat the exhaust gas to reduce or eliminate emissions (carbon monoxide, hydrocarbons, nitrogen oxides, particulate matter, etc.) prior to releasing the exhaust gas into the atmosphere. One non-limiting example of the exhaust treatment device 180 is a three-way catalytic converter, but it will be appreciated that any suitable exhaust treatment devices could be implemented. A controller 184 controls operation of the engine 104, including, but not limited to, controlling airflow via the throttle valve 116, fueling via the fuel system 124, and ignition via the optional spark plugs 152. The controller 184 also performs at least a portion of the diagnostic techniques of the present disclosure, which will be discussed in greater detail below. In some implementations, these diagnostic techniques involve the controller 184 communicating with a diagnostic device 204 (e.g., a handheld computing device) operated by a human technician 208 as described in greater detail below.

Figure 2:
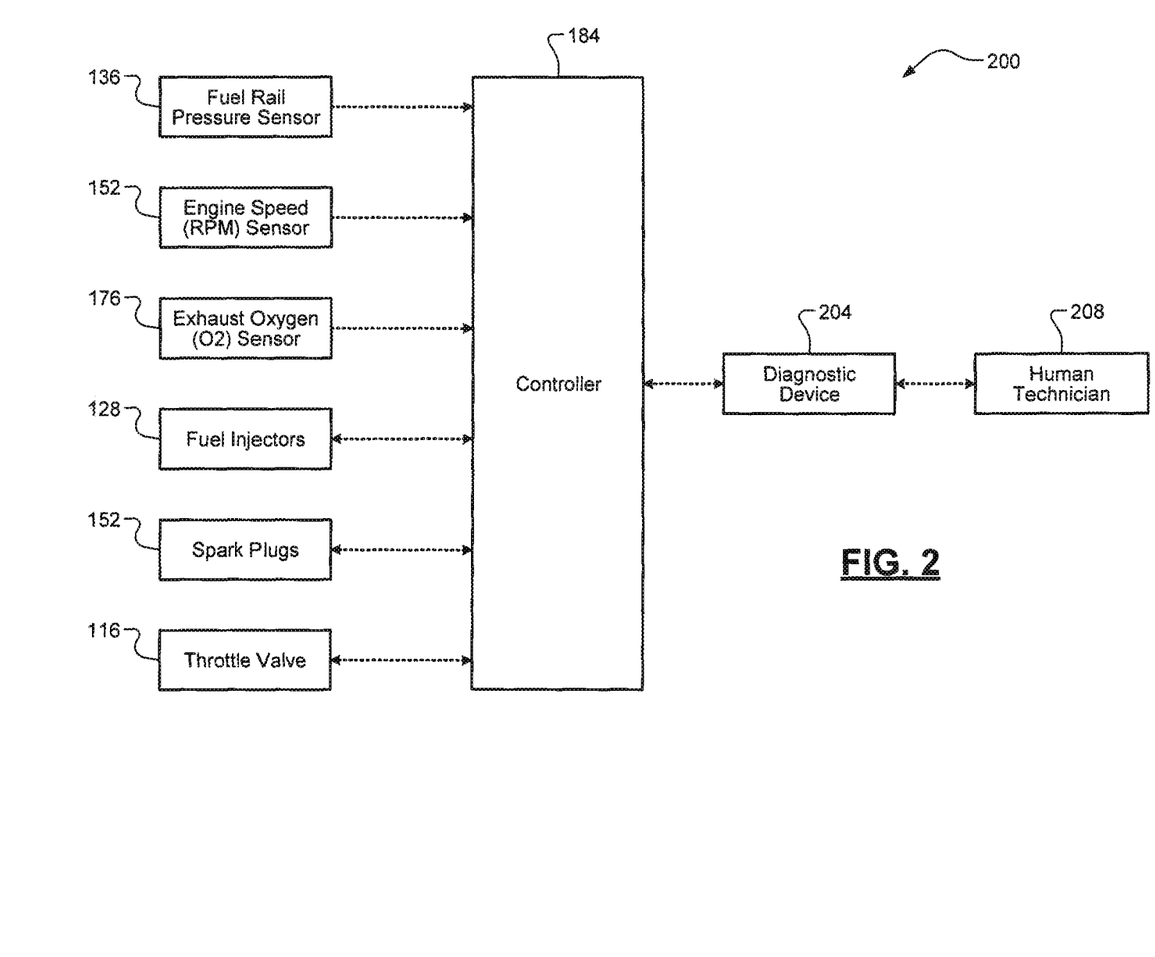
FIG. 2 is a diagram of an example fuel system diagnostic system according to the principles of the present disclosure.

Referring now to FIG. 2, a functional block diagram of a diagnostic system 200 for the fuel system 124 of the engine 104 is illustrated. As shown, the controller 184 receives signals from the fuel rail pressure sensor 136, the engine speed sensor 156, and the exhaust O2 sensor 176. The controller 184 also communicates with the throttle valve 116 to achieve a desired airflow. The controller 184 also commands the fuel injectors 128 (e.g., according to pulse-width modulated, or PWM signals) and the optional spark system 152 to achieve a desired fueling and a desired combustion timing. By controlling airflow/fueling and, optionally, spark, the controller 184 is able to vary the engine speed and the amount of drive torque produced by the engine 104. An "idle engine speed" as used herein refers to the engine speed remaining stable at or approximately at a particular value. Lastly, the controller 184 also communicates with the diagnostic device 204.

Figure 3:
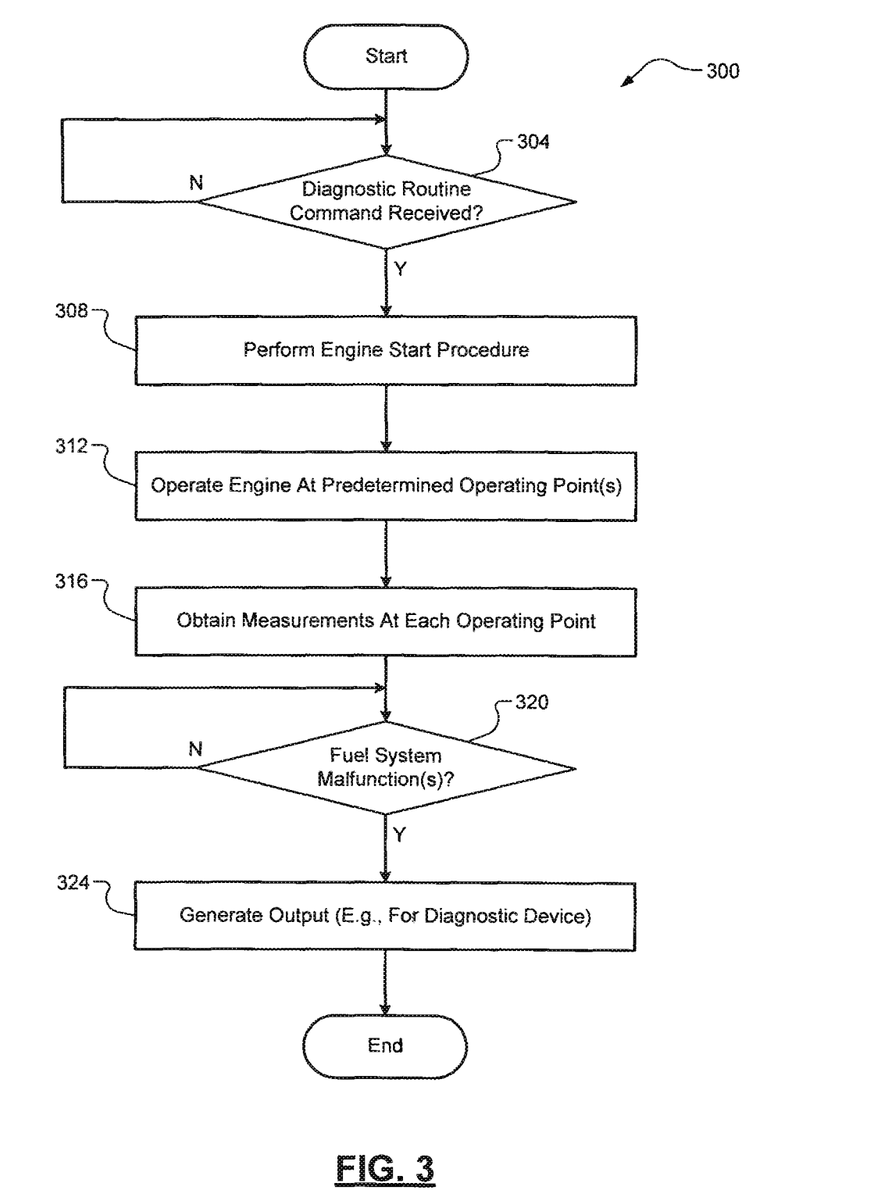
FIGS. 3 and 4A-4B are flow diagrams of example fuel injector diagnostic methods according to the principles of the present disclosure.

Referring now to FIG. 3, a flow diagram of an example diagnostic method 300 for the fuel system 124 of the engine 104 is illustrated. The diagnostic method 300 could be performed, for example, by the controller 184. At 304, the controller 184 determines whether a command has been received from the diagnostic device 204 (e.g., input by the human technician 208) to initiate the diagnostic routine. When true, the method 300 proceeds to 308. Otherwise, the method 300 ends or returns to 304. At 308, the controller 184 executes a stark procedure for the engine 104. It will be appreciated that the controller 184 could also check for certain preconditions before starting the engine 104, such as a lack of other diagnostic faults or detected malfunctions. In some implementations, this start procedure includes allowing the engine 104 to run for a warm-up period such that stable test conditions are present. At 312 and 316, the controller 184 commands the engine 104 to operate at a set of one or more predetermined operating points and obtains respective measurements at each operating point.

In one exemplary implementation, at each predetermined operating point, the controller 184 obtains measured fuel rail pressure, measured engine speed, and measured exhaust O2 concentration from the respective sensors 136, 156, and 176. In one exemplary implementation, the set of predetermined operating points each includes at least one of (i) a predetermined idle speed of the engine 104 and (i) a predetermined commanded fuel rail pressure. In one exemplary implementation, the set of predetermined operating points are determined such that different types of malfunctions of the fuel system 124 are able to be distinguished from each other. It will be appreciated that features 312 and 316 could be repeated for each successive predetermined operating points. At 320, the controller 184 detects whether one or more malfunctions of the fuel system 124 are present based on the measured fuel rail pressure, the measured engine speed, and the measured O2 concentration at each of the set of predetermined operating points.

In one exemplary implementation, feature 320 further includes the controller 184 calculating and utilizing at least one of (i) a coefficient of variation (COV) of the measured engine speed, a fuel rail pressure error indicative of a difference between a commanded fuel rail pressure and the measured fuel rail pressure, and the fuel trim correction value based on the measured O2 concentration. The specific correlation of these calculated values and an example of their use is discussed in greater detail below with respect to FIGS. 4A-4B. At 324, the controller 184 generates output indicative of any detected malfunctions of the fuel system 124. In some implementations, this includes the controller 184 outputting information to the diagnostic device 204, which causes the diagnostic device 204 to display the information to the human technician 208. It will be appreciated that the outputting by the controller 184 could merely be activating a malfunction indicator lamp (MIL) and/or setting a diagnostic trouble code (DCT), which could later be retrieved by the human technician 208 (e.g., using the diagnostic device 204). The method 300 then ends or returns to 304.

Figure 4A:
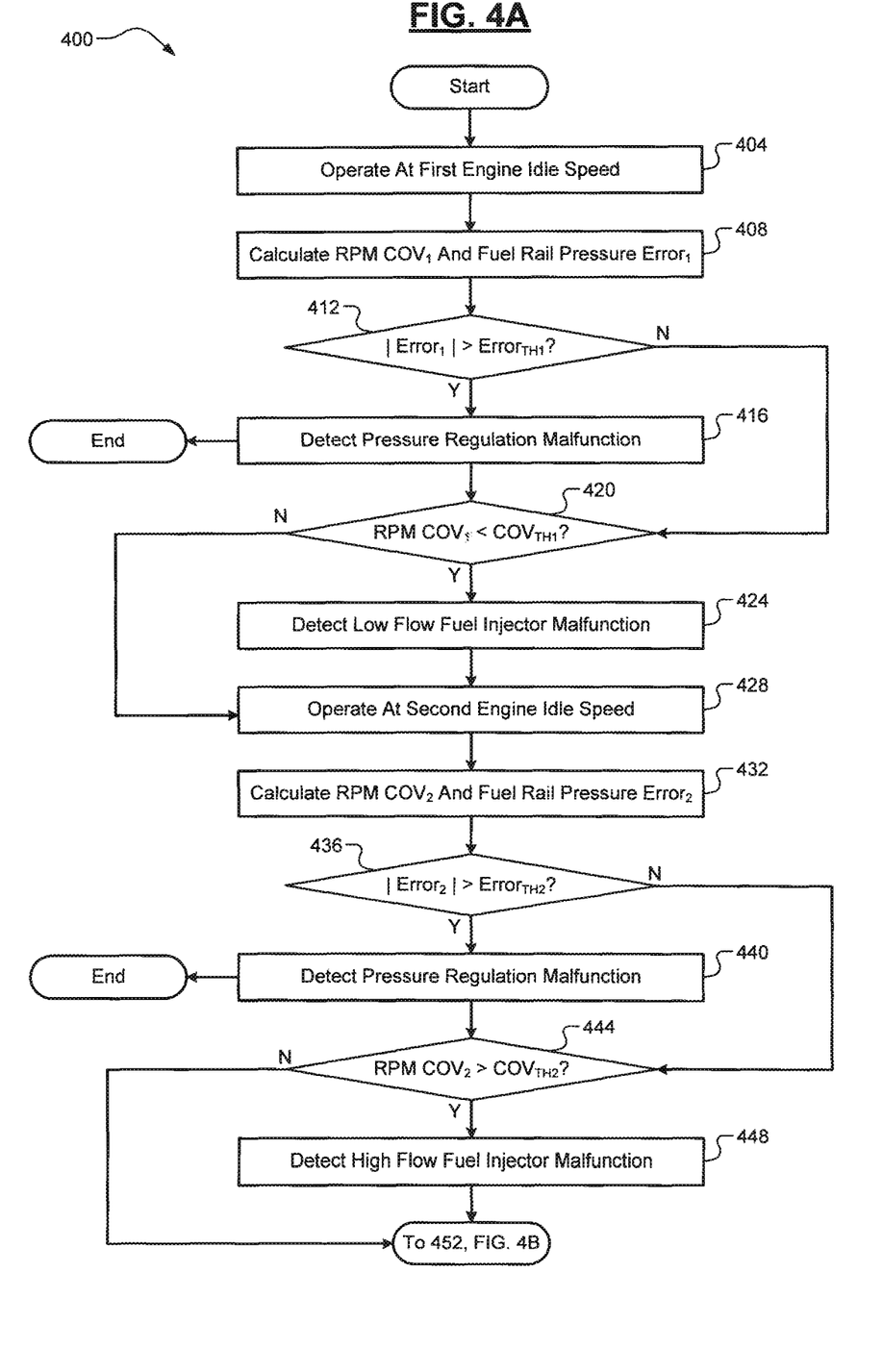
Figure 4B:
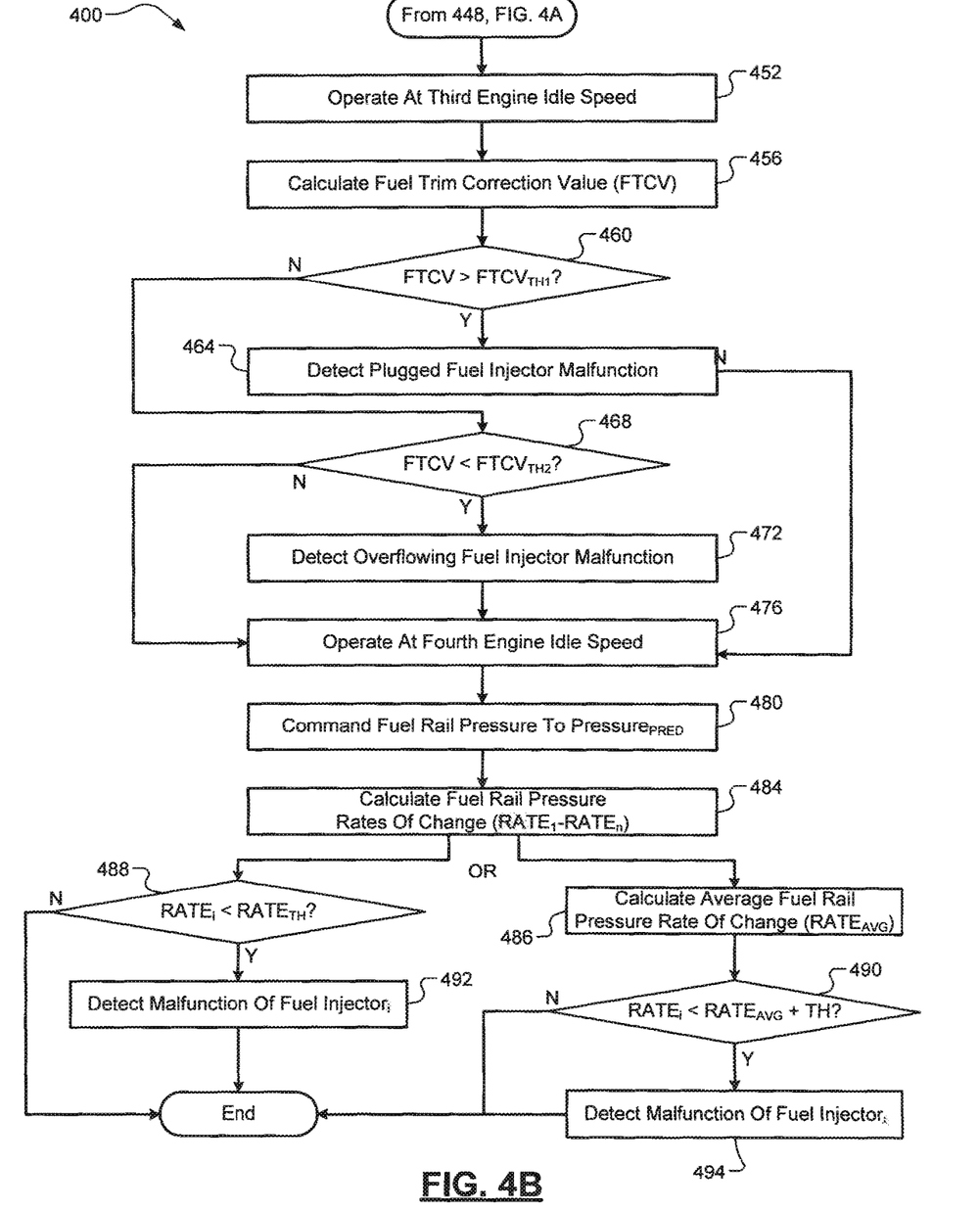

Referring now to FIGS. 4A-4B, flow diagrams of one exemplary implementation of features 312-320 of FIG. 3A are illustrated and generally referred to as 400. The fuel trim correction value indicates an aggregate shift in the fuel injector flow rates, but this alone cannot pinpoint the faulty fuel injectors. The fuel rail pressure responds to fuel injector opening events by dropping momentarily after each fuel injection event (also referred to as a "pressure dip"). The magnitude and duration of the pressure dip are proportional to the fuel injector flow rate. The engine speed COV is indicative of the consistency of the fueling. At low idle speeds, the fuel injectors 128 should be operating in a non-linear range, thereby resulting in a higher engine speed COV. Thus, when the engine 104 is operating smoothly at low idle it would indicate that the fuel injectors 128 are opening longer than expected due to reduced static flow rate. Alternatively, at high idle speeds, the fuel injectors 128 should be operating in a linear range. Thus, when the engine 104 is operating roughly at high idle it would indicate that the fuel injectors 128 are opening shorter than expected due to increased static flow rate.

At 404, the controller 184 commands the engine 104 to operate at a first predetermined operating point corresponding to a first idle speed of the engine. In one exemplary implementation, this first engine idle speed is approximately 650 RPM, but it will be appreciated that the speed could be calibratable and could vary depending on the particular configuration of the engine 104. At 408, the controller 184 calculates the engine speed COV (RPM $COV_1$) and the fuel rail pressure error (Error)). At 412, the controller 184 determines whether a magnitude of the fuel rail pressure error exceeds a first fuel rail pressure error threshold ($Error_{TH1}$). In one exemplary implementation, this threshold is approximately 5%. When true, the method proceeds to 416 where the controller 184 detects a fuel pressure regulation malfunction and the method 400 ends. When false, the method 400 proceeds to 420 where the controller 184 determines whether the engine speed COV is less than a first COV threshold ($COV_{TH1}$). In one exemplary implementation, the first COV threshold is approximately 4%. When true, the method 400 proceeds to 424 where the controller 184 detects a low flow fuel injector malfunction and the method 400 proceeds to 428, Otherwise, the method 400 proceeds to 428.

At 428, the controller 184 commands the engine 104 to operate at a second predetermined operating point corresponding to a second idle speed of the engine 104, the second idle engine speed being greater than the first idle engine speed. In one exemplary implementation, the second idle engine speed is approximately 1000 RPM, but it will be appreciated that the speed could be calibratable and could vary depending on the particular configuration of the engine 104. At 432, the controller 184 calculates the engine speed COV (RPM $COV_2$) and the fuel rail pressure error ($Error_2$). At 436, the controller 184 determines whether the whether a magnitude of the fuel rail pressure error exceeds a second fuel rail pressure error threshold ($Error_{TH2}$). In one exemplary implementation, this threshold is approximately 5%. When true, the method 400 proceeds to 440 where the controller 184 detects a fuel pressure regulation malfunction and the method 400 ends. For example, there could be another leak in the fuel system 124 that is causing a pressure issue. Otherwise, the method 400 proceeds to 444 where the controller 184 determines whether the engine speed COV is greater than a second COV threshold ($COV_{TH2}$). In one exemplary implementation, this second COV threshold is approximately 4%. When true, the method 400 proceeds to 448 where the controller 184 detects a high flow fuel injector malfunction and the method 400 proceeds to 452. Otherwise, the method 400 proceeds to 452.

At 452, the controller 184 commands the engine 104 to operate at a third predetermined operating point corresponding to a third idle speed of the engine 104, the third idle engine speed being greater than the second idle engine speed. In one exemplary implementation, the third idle engine speed is approximately 4000 RPM, but it will be appreciated that the speed could be calibratable and could vary depending on the particular configuration of the engine 104. At 456, the controller 184 calculates the fuel trim correction value (FTCV). At 460, the controller 184 determines whether the fuel trim correction value is greater than a first fuel trim correction threshold ($FTCV_{TH1}$). In one exemplary implementation, the first fuel trim correction threshold is approximately 20%. When true, the method 400 proceeds to 464 where the controller 184 detects a plugged fuel injector malfunction and the method proceeds to 476. Otherwise, the method 400 proceeds to 468. At 468, the controller 184 determines whether the fuel trim correction value is less than a second fuel trim correction threshold ($FTCV_{TH2}$). In one exemplary implementation, the second fuel trim correction threshold is approximately −20%. When true, the method 400 proceeds to 472 where the controller 184 detects an overflowing fuel injector malfunction and the method 400 proceeds to 476. Otherwise, the method 400 proceeds to 476.

At 476, the controller 184 commands the engine 104 to operate at a fourth predetermined operating point corresponding to a fourth idle speed of the engine 104, the fourth idle engine speed being less than the third idle engine speed and greater than the first and second idle engine speeds. In one exemplary implementation, the fourth idle engine speed is approximately 2000 RPM, but it will be appreciated that the speed could be calibratable and could vary depending on the particular configuration of the engine 104. At 480, the controller 184 commands the fuel rail pressure to drop to a predetermined fuel pressure ($Pressure_{PRED}$). In one exemplary implementation, the predetermined fuel rail pressure is approximately 100 bar, but it will be appreciated that the pressure could be calibratable and could vary depending on the particular configuration of the engine 104. At 484, the controller 184 calculates a rate of change (RATE) of the measured fuel rail pressure after each fuel injection event ($Injector_1$ . . . $Injector_n$, where n equals the number of cylinders 120, e.g., six) of the engine 104. In one exemplary implementation, the controller 184 may collect this data across a number of engine cycles (e.g., 10 engine cycles) before calculating.

At 488, the controller 184 determines whether the calculated rate of change of the measured fuel rail pressure (the pressure dip) is less than a rate of change threshold ($RATE_{TH}$). When true, the method 400 proceeds to 492 where the controller 184 detects a malfunction of the particular fuel injector 128 ($Injector_i$, where i is an index from 1 . . . n) corresponding to the previous fuel injection event and the method 400 ends. Otherwise, the method 400 ends if 488 is not true for any of the fuel injectors 128. As an alternative to features 488-492, 482 the controller 184 could at 486 calculate an average rate of change ($RATE_{AVG}$) of the measured fuel rail pressure across all of the fuel injectors 128. Then, at 490, the controller 184 could determine whether any of the calculated rates of change of the measured fuel rail pressure (the pressure dips) for any of the fuel injectors 128 (Injector$_i$) are less than the calculated average rate of change by more than a threshold amount (TH) (i.e., detect any outliers). When true, the method 400 could proceed to 494 where a malfunction of one or more of the fuel injectors 128 (Injector$_i$) could be detected by the controller 184 and the method 400 could then end. Otherwise, the method 400 ends if 488 is not true for any of the fuel injectors 128.

It will be appreciated that the diagnostic routine could produce and output a single diagnostic report, e.g., to the diagnostic device 204. This diagnostic report could include any of the detected malfunctions described above (e.g., a "Y" or "N" for each malfunction). This diagnostic report could be utilized or even included, for example, in warranty claims such that supplier costs can be correctly recouped. The diagnostic report can also direct the human technician 208 to which of the fuel injectors 128 (if any) need to be replaced or tested further. This would also allow the human technician 208 to better understand how the fuel injectors 128 (if any) are malfunctioning, e.g., to judge secondary damage to the engine 104, which could be traced to a particular type of malfunction.

It will also be appreciated that the specific values used for the engine idle speed thresholds, the fuel rail pressure error thresholds, the engine speed COV thresholds, the fuel trim correction value thresholds, and the fuel rail pressure threshold are merely for example purposes and are not intended to limit these values. As stated throughout this description, it will be appreciated that these values could be calibratable (e.g., based on testing data) and/or could vary depending on the configuration of the engine 104 (gasoline vs. diesel, port vs. fuel injection, number of cylinders/displacement, etc.). As previously stated, the set of one or more predetermined operating points are determined such that different types of malfunctions of the fuel system 124 are able to be distinguished from each other (pressure regulation malfunction, low flow fuel injector, high flow fuel injector, plugged fuel injector, overflowing fuel injector, fuel injector failure, etc.).

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A diagnostic system for a fuel system of an engine of a vehicle, the diagnostic system comprising:
    a fuel rail pressure sensor configured to measure a fuel rail pressure indicative of a pressure of a fuel in a fuel rail of the fuel system, wherein the fuel rail provides the fuel to fuel injectors of the fuel system;
    an engine speed sensor configured to measure an engine speed indicative of a rotational speed of a crankshaft of the engine;
    an exhaust oxygen (O2) sensor configured to measure an O2 concentration indicative of an oxygen level of exhaust gas produced by the engine; and
    a controller configured to perform a diagnostic routine for the fuel system during which the fuel injectors do not need to be removed from the engine, the diagnostic routine comprising:
        operating the engine at a set of predetermined operating points; and
        detecting one or more malfunctions of one or more of the fuel injectors while the one or more fuel injectors remain installed on the engine based on the measured fuel rail pressure, the measured engine speed, and the measured O2 concentration at each of the set of predetermined operating points.

2. The system of claim 1, wherein the set of predetermined operating points each includes at least one of (i) a predetermined idle speed of the engine, and (ii) a predetermined commanded fuel rail pressure.

3. The system of claim 2, wherein the set of predetermined operating points are determined such that different types of malfunctions of the one or more fuel injectors are able to be distinguished from each other.

4. The system of claim 1, wherein the controller is configured to, at each predetermined operating point, calculate and utilize at least one of:
    a coefficient of variation (COV) of the measured engine speed;
    a fuel rail pressure error indicative of a difference between a commanded fuel rail pressure and the measured fuel rail pressure; and
    a fuel trim correction value based on the measured O2 concentration.

5. The system of claim 4, wherein the controller is configured to:
    operate the engine at a first predetermined operating point corresponding to a first idle speed of the engine;
    detect a fuel pressure regulation malfunction when the fuel rail pressure error exceeds a first fuel rail pressure error threshold; and
    detect a low flow fuel injector malfunction when the COV is less than a first COV threshold.

6. The system of claim 5, wherein the controller is configured to:
    operate the engine at a second predetermined operating point corresponding to a second idle speed of the engine, the second idle engine speed being greater than the first idle engine speed;
    detect the fuel pressure regulation malfunction when the fuel rail pressure exceeds a second fuel rail pressure threshold; and
    detect a high flow fuel injector malfunction when the COV is greater than a second COV threshold.

7. The system of claim 6, wherein the controller is configured to:
    operate the engine at a third predetermined operating point corresponding to a third idle speed of the engine, the third idle engine speed being greater than the second idle engine speed;
    detect a plugged fuel injector malfunction when the fuel trim correction value is greater than a fuel trim correction threshold; and detect an overflowing fuel injector malfunction when the fuel trim correction value is less than the fuel trim correction threshold.

8. The system of claim 7, wherein the controller is configured to:
operate the engine at a fourth predetermined operating point corresponding to a fourth idle speed of the engine, the fourth idle engine speed being less than the third idle engine speed and greater than the first and second idle engine speeds;
command the fuel rail pressure to a predetermined fuel rail pressure;
calculate a rate of change of the measured fuel rail pressure after each fuel injection event of the engine; and
detect a malfunction of a particular one of the fuel injectors corresponding to the previous fuel injection event when the corresponding calculated rate of change of the measured fuel rail pressure is less than a rate of change threshold.

9. The system of claim 7, wherein the controller is configured to:
operate the engine at a fourth predetermined operating point corresponding to a fourth idle speed of the engine, the fourth idle engine speed being less than the third idle engine speed and greater than the first and second idle engine speeds;
command the fuel rail pressure to a predetermined fuel rail pressure;
calculate a rate of change of the measured fuel rail pressure after each fuel injection event of the engine;
calculate an average rate of change of the measured fuel rail pressure indicative of an average of the calculated rates of change of the measured fuel rail pressure across all of the fuel injectors; and
detect a malfunction of a particular one of the fuel injectors when its corresponding calculated rate of change of the measured fuel rail pressure is more than a threshold amount less than the calculated average rate of change of the measured fuel pressures.

10. A diagnostic method for a fuel system of an engine of a vehicle, the method comprising:
obtaining, by a controller and from a fuel rail pressure sensor, a measured fuel rail pressure indicative of a pressure of a fuel in a fuel rail of the fuel system, wherein the fuel rail provides the fuel to fuel injectors of the fuel system;
obtaining, by the controller and from an engine speed sensor, a measured engine speed indicative of a rotational speed of a crankshaft of the engine;
obtaining, by the controller and from an exhaust oxygen (O2) sensor, a measured O2 concentration indicative of an oxygen level of exhaust gas produced by the engine; and
performing, by the controller, a diagnostic routine for the fuel system during which the fuel injectors do not need to be removed from the engine, the diagnostic routine comprising:
operating, by the controller, the engine at a set of predetermined operating points; and
detecting, by the controller, one or more malfunctions of one or more of the fuel injectors while the one or more fuel injectors remain installed on the engine based on the measured fuel rail pressure, the measured engine speed, and the measured O2 concentration at each of the set of predetermined operating points.

11. The method of claim 10, wherein the set of predetermined operating points each includes at least one of (i) a predetermined idle speed of the engine, and (ii) a predetermined commanded fuel rail pressure.

12. The method of claim 11, wherein the set of predetermined operating points are determined such that different types of malfunctions of the one or more fuel injectors are able to be distinguished from each other.

13. The method of claim 10, further comprising, at each predetermined operating point, calculating and utilizing, by the controller, at least one of:
a coefficient of variation (COV) of the measured engine speed;
a fuel rail pressure error indicative of a difference between a commanded fuel rail pressure and the measured fuel rail pressure; and
a fuel trim correction value based on the measured O2 concentration.

14. The method of claim 13, further comprising:
operating, by the controller, the engine at a first predetermined operating point corresponding to a first idle speed of the engine;
detecting, by the controller, a fuel pressure regulation malfunction when the fuel rail pressure error exceeds a first fuel rail pressure error threshold; and
detecting, by the controller, a low flow fuel injector malfunction when the COV is less than a first COV threshold.

15. The method of claim 14, further comprising:
operating, by the controller, the engine at a second predetermined operating point corresponding to a second idle speed of the engine, the second idle engine speed being greater than the first idle engine speed;
detecting, by the controller, the fuel pressure regulation malfunction when the fuel rail pressure exceeds a second fuel rail pressure threshold; and
detecting, by the controller, a high flow fuel injector malfunction when the COV is greater than a second COV threshold.

16. The method of claim 15, further comprising:
operating, by the controller, the engine at a third predetermined operating point corresponding to a third idle speed of the engine, the third idle engine speed being greater than the second idle engine speed;
detecting, by the controller, a plugged fuel injector malfunction when the fuel trim correction value is greater than a fuel trim correction threshold; and
detecting, by the controller, an overflowing fuel injector malfunction when the fuel trim correction value is less than the fuel trim correction threshold.

17. The method of claim 16, further comprising:
operating, by the controller, the engine at a fourth predetermined operating point corresponding to a fourth idle speed of the engine, the fourth idle engine speed being less than the third idle engine speed and greater than the first and second idle engine speeds;
commanding, by the controller, the fuel rail pressure to a predetermined fuel rail pressure;
calculating, by the controller, a rate of change of the measured fuel rail pressure after each fuel injection event of the engine; and
detecting, by the controller, a malfunction of a particular one of the fuel injectors corresponding to the previous fuel injection event when the corresponding calculated rate of change of the measured fuel rail pressure is less than a rate of change threshold.

18. The method of claim 17, further comprising:
operating, by the controller, the engine at a fourth predetermined operating point corresponding to a fourth idle speed of the engine, the fourth idle engine speed being less than the third idle engine speed and greater than the first and second idle engine speeds;
commanding, by the controller, the fuel rail pressure to a predetermined fuel rail pressure;
calculating, by the controller, a rate of change of the measured fuel rail pressure after each fuel injection event of the engine;
calculating, by the controller, an average rate of change of the measured fuel rail pressure indicative of an average of the calculated rates of change of the measured fuel rail pressure across all of the fuel injectors; and
detecting, by the controller, a malfunction of a particular one of the fuel injectors when its corresponding calculated rate of change of the measured fuel rail pressure is more than a threshold amount less than the calculated average rate of change of the measured fuel pressures.

* * * * *